May 23, 1961  H. W. GEORGI  2,985,822

MODULATION SYSTEM FOR CASING COLLAR LOCATORS

Filed Sept. 16, 1957

*INVENTOR.*
HEINZ WERNER GEORGI
BY
Robert K. Schumacher
ATTORNEY

United States Patent Office 2,985,822
Patented May 23, 1961

2,985,822

MODULATION SYSTEM FOR CASING COLLAR LOCATORS

Heinz W. Georgi, Tulsa, Okla., assignor to Well Surveys, Incorporated, a corporation of Delaware Filed Sept. 16, 1957, Ser. No. 684,291

9 Claims. (Cl. 324—34)

This invention relates to casing collar locators and is particularly directed to novel means for impressing the casing collar signal on a cable for transmission to the surface of the earth.

In subsurface geophysical exploration, such as the logging and perforation of oil wells, the instruments to be used must be lowered into a borehole to depths of several thousand feet below the surface of the earth. To do this, the instruments must be suspended in the borehole on the end of a flexible cable which is wound or unwound from a drum at the surface. The cable generally contains at least one electrical conductor for transmitting signals from the subsurface instrument to the surface of the earth and for carrying power from the surface down to the instrument. The instruments employed may weigh several hundred pounds and, in the lengths required for these purposes, the weight of the cable itself may be considerable. As a result of this, the cable may stretch as much as 100 feet or more as the instrument is lowered into the borehole. Therefore, devices which measure the length of the cable as it is payed out from the drum at the surface of the earth are not reliable as indicators of the depth of the instrument within the borehole. On the other hand, it is extremely important that the position of the instrument be known in order that the measurements, perforations or other work accomplished by the instrument may be correlated with other information concerning the well. For example, if a radioactivity log has been made of the well and the log indicates an oil bearing formation at a given depth, it is obvious that a perforator lowered into the well to open up this formation must be lowered to the same depth. If the depth measurements of either the logging instrument or the perforator are inaccurate, the perforations may be made in the wrong place and much time and money will be wasted, and the objective of the work will not be achieved. In boreholes which have been lined with casing, it is common practice to provide means on the instrument which can locate the casing joints or collars, and these may then be employed as depth indicators.

Numerous means have been suggested heretofore for detecting the collars and for impressing the signals from the instruments onto the cable for transmission to the surface. However, none of them have been entirely satisfactory. Generally, the signal from the casing collar detector is used to modulate a carrier wave which is transmitted up the cable. Most casing collar detectors emit a plurality of both positive and negative pulses as the instrument passes a collar. However, only one of these pulses represents the true location of the collar. Unfortunately, the signals emitted by casing collar detectors are too small to permit rectification by conventional means and the devices of the prior art modulate the carrier with the unrectified signal. However, when this is done, the positive and negative pulses cannot be distinguished subsequently. Accordingly, it is difficult, if not impossible, to distinguish the true pulse from the others. Furthermore, virtually all casing collar detectors are responsive to speed. Thus, the more rapidly the instrument is passed through the well, the larger the signal from the detector. Moreover, the modulating systems employed heretofore have rapidly become overloaded and the signals were distorted. When this occurred, it frequently became difficult or impossible to accurately locate a collar and the benefit of the collar log was destroyed. Moreover, these systems were not generally capable of adjustment.

These disadvantages of prior art modulating systems are overcome with the present invention and a system is provided which permits rectification of the detector signal. In addition, the modulating system of the present invention sorts the true pulse from the false pulses and substantially eliminates the false pulses. Thus, the device of the present invention provides accurate and reliable collar logs while preventing distortion of the signals due to overloading of the circuit and may be adjusted to vary the gain of the system as desired.

The advantages of the present invention are preferably attained by providing a magnetic amplifier having the control winding thereof connected to receive the signal from the casing collar detector and having the reactive windings thereof connected to modulate a carrier wave which may be transmitted up the cable. Moreover, the reactive windings are connected in such a way as to provide a positive feedback and resistance means are connected between the reactive windings to provide a gain control for the magnetic amplifier.

Accordingly, it is an object of the present invention to provide a novel modulating system for casing collar signals which will pass the true pulse from the detector while substantially eliminating other pulses.

Another object of the present invention is to provide a novel modulating system for casing collar signals which will prevent overloading of the circuit.

A further object of the present invention is to provide a novel modulating system for casing collar signals which permits rectification of the detector signal.

An additional object of the present invention is to provide a novel magnetic amplifier having means for varying the gain thereof.

A specific object of the present invention is to provide a novel modulating system for casing collar signals comprising a magnetic modulator having the control winding thereof connected to receive the signal from the casing collar detector and having the reactive windings thereof connected to modulate a carrier wave which may be transmitted up the cable while providing a positive feedback, and resistance means connected between the reactive windings to vary the gain of said magnetic amplifier.

These and other objects and features of the present invention will be apparent from the following description wherein reference is made to the figures of the accompanying drawing.

Figure 1:
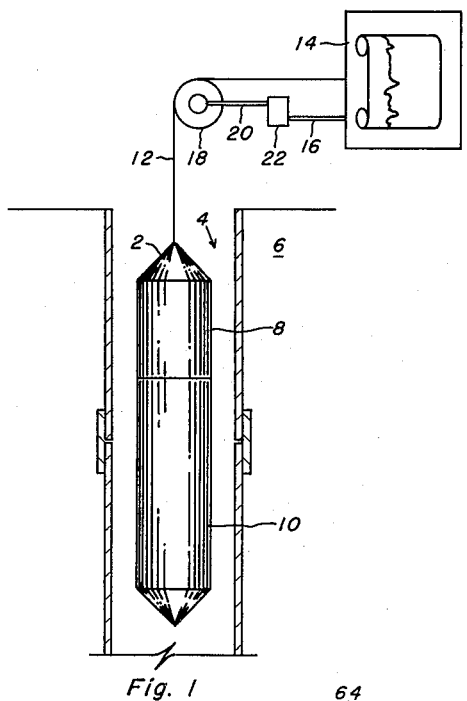
Fig. 1 is a diagrammatic representation of a typical apparatus for radioactivity well logging.

In that form of the present invention chosen for purposes of illustration in the drawing, Fig. 1 shows a subsurface instrument 2 suspended in well 4 in the earth 6. The instrument 2 has a casing collar locator 8 and a portion 10 which may be a radioactivity logging detector or other desirable apparatus. In any event, the instrument 2 is suspended in the well 4 by means of cable 12 comprising at least one electrical conductor which serves to transmit signals from the instrument 2 to the surface and to carry power from the surface to the instrument 2. At the surface, the signal or signals are recorded on a moving strip recorder 14.

Ordinarily, the recorder strip is moved in general correlation with the depth of the instrument 2 by shaft 16 which is driven by measuring wheel 18, located adjacent the top of the well, through shaft 20 and transmission 22. However, as indicated above, the cable 12 may stretch considerably as a result of its own weight and that of the instrument 2. Consequently, this depth indication is only general and the collar log must be relied upon for accurate depth indications.

Casing collar detectors in commercial use today are generally magnetic devices comprising a combination of magnets and inductive coils. The devices respond to the magnetic anomalies caused by casing collars or joints and emit a signal. The signal may be similar to that shown in Fig. 2, having two small negative voltage pulses 24 and 26 and a large central positive pulse 28 or may be a multiple of these. In the form shown, the central pulse 28 is the true pulse and is the only one which accurately indicates the casing joint. Unfortunately, the signals from the casing collar detector are too small to permit rectification by conventional means. Consequently, the devices of the prior art have passed the detector signal directly to a linear modulator to be impressed on a carrier wave for transmission to the surface. However, since the carrier wave must be at least partly suppressed to prevent interference with other signals on the cable, linear modulators cannot distinguish between positive and negative pulses but impress both types of signals on the carrier in such a way that it is impossible to separate them. This results in a signal, such as the one shown in Fig. 3, having two false envelopes 30 and 32, corresponding to pulses 24 and 26, and a large central envelope 34 which corresponds to the true pulse 28.

If the instrument 2 traverses the well slowly, this type of device may be satisfactory and the signal-to-noise ratio may be maintained within tolerable limits. However, as stated previously, the faster the instrument is moved, the larger the signal generated by the detector. Thus, at speeds as low as 50 feet per minute, the signal will be so large that it will overload the circuit and become distorted. When this happens, the true pulses 28 and 34 reach a maximum and cannot become any larger. On the other hand, the pulses 24 and 26 and 30 and 32 and the random noise pulses tend to become the same size as the true pulses 28 and 34. Consequently, the true pulses become indistinguishable from the other pulses and the noise, and the collar log becomes useless.

Figure 4:
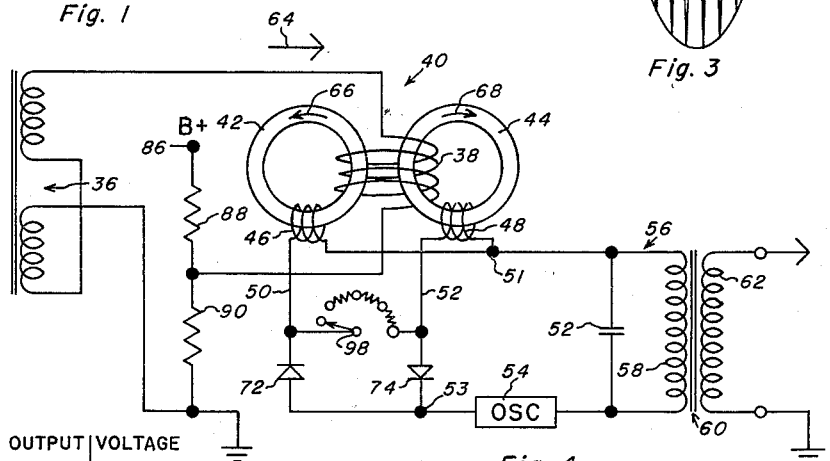
Fig. 4 is a diagrammatic representation of a typical modulating system for casing collar signals embodying the present invention.

These problems are overcome with the present invention by employing a magnetic amplifier in the modulating system, as shown in Fig. 4. In this form of the invention, the casing collar detector, indicated generally by 36, is connected to supply its signal to the control winding 38 of a magnetic amplifier 40. The magnetic amplifier 40 may comprise a conventional three-legged transformer core. However, preferably, two separate toroids 42 and 44, are employed, formed of soft iron or the like. The toroids 42 and 44 are coupled by the control windings 38 and each carrying a separate reactive winding 46 and 48 respectively. The reactive windings 46 and 48 are connected respectively in parallel paths 50 and 52 between terminals 51 and 53 and these paths are connected in series with an oscillator 54 and a resonant circuit 56. The oscillator 54 generates a carrier wave having a frequency much greater than that of the signal on the control windings 38. This carrier is modulated by the magnetic amplifier 40. In addition, the inductive winding 58 of the resonant circuit 56 forms part of output transformer 60 which has a secondary winding 62 connected to the conductor of the cable 12 whereby the signals are transmitted to the surface.

Figure 2:
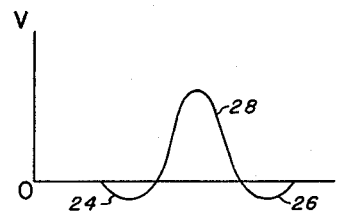
Fig. 2 is a graphic representation of a pulse emitted by a typical casing collar detector as the instrument is moved past a casing collar.
Figure 3:
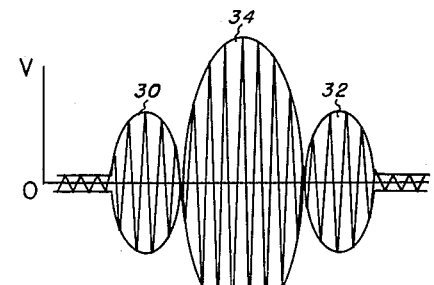
Fig. 3 is a graphic representation of a carrier wave modulated by a typical modulator of the prior art.

Since the carrier wave has a frequency much greater than that of the control current, as indicated above, the control current may be considered as a direct current which flows in the direction indicated by arrow 64 of Fig. 4 during the portion 28 of the detector signal, shown in Fig. 2, and in the direction opposite to arrow 64 of Fig. 4 during the portions 24 and 26 of the detector signal of Fig. 2. If the control current is flowing in the direction of arrow 64, this current will induce a flux in the toroids 42 and 44 flowing in the direction of arrows 66 and 68.

A second direct current may be derived from the carrier current and be passed through the reactive windings 46 and 48 in such a way as to induce fluxes in toroids 42 and 44 flowing in the same direction as arrows 66 and 68. These fluxes will be added to the flux induced by the control current and will tend to increase the flow of carrier current. This phenomenon, which is called "positive feedback" results in effectively increasing the gain of the magnetic amplifier.

On the other hand, if current is passed through the reactive windings 46 and 48 in such a way as to induce fluxes in toroids 42 and 44 flowing opposite to the directions indicated by arrows 66 and 68, these fluxes will be subtracted from the flux induced by the control current and will tend to decrease the flow of carrier current. This effect is called "negative feedback" and results in effectively decreasing the gain of the magnetic amplifier.

Obviously, when the control current is flowing in the direction opposite to arrow 64, a direct current flowing through the reactive windings 46 and 48 in a direction to induce fluxes in toroids 42 and 44 flowing in the directions of arrows 66 and 68 would result in negative feedback while a current flowing through the reactive windings in the opposite direction would result in positive feedback.

In the device of the present invention, both types of feedback are employed. As seen in Fig. 4, the reactive windings 46 and 48 each have one side thereof connected to a common terminal 51. Rectifying means, such as diode 72, have one side thereof connected to the other side of winding 46 and the other side of diode 72 is connected to terminal 53. Similarly, diode 74, has one side connected to the other side of winding 48 while the other side of diode 74 is connected to terminal 53. The diodes 72 and 74 are so arranged that current from oscillator 54 flows through winding 46 only during positive half cycles and through winding 48 only during negative half cycles. Moreover, the windings 46 and 48 are so wound that the currents passing therethrough produce fluxes in toroids 42 and 44 in the directions indicated by arrows 66 and 68. Thus, when the current through control winding 38 flows in the direction of arrow 64, as during the true pulse 28 of the detector signal of Fig. 2, the current through reactive windings 46 and 48 produces positive feedback and the amplification of the detector signal will be increased.

Figure 5:
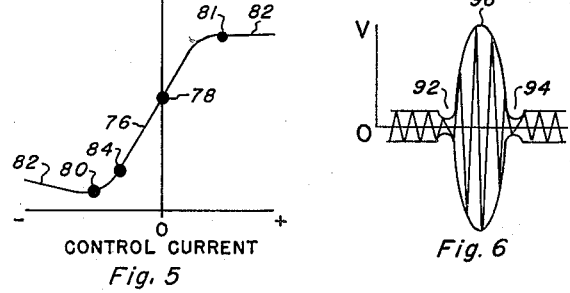
Fig. 5 is a graphic representation of the operating characteristic of the modulating system of Fig. 4.

As seen in Fig. 5, the output voltage of the magnetic amplifier of Fig. 4 is not at its lowest point when no current is flowing in the control winding 38. This is because some flux is induced in the toroids 42 and 44 by the feedback current derived from the unmodulated carrier. Thus, with no control current applied, the system operates about point 78 on curve 76 of Fig. 5. At small values of negative control current, the flux induced in toroids 42 and 44 by the control current will be less than the opposing flux induced by the feedback current. The total effective flux in toroids 42 and 44 will thus be reduced by an amount equal to the flux induced by the control current. This shifts the system along curve 76 to the left of point 78 and the output voltage of the magnetic amplifier will be reduced proportionately. When the negative control signal is sufficient to induce a flux equal to that of the feedback current, curve 76 reaches its lowest point 80 and the output voltage of the magnetic amplifier is at its minimum value. However, even in these circumstances there will be some small residual flow of current through the reactive windings 46 and 48. Consequently, there is always some output from the magnetic amplifier and the curve 76 never reaches zero voltage. As the control current becomes more negative, flux induced by the control current exceeds that induced by the feedback current and a negative feedback condition obtains. When this happens, curve 76 begins to rise again, as seen to the left of point 80, since the total effective flux in the toroids 42 and 44 is greater than at point 80. As the curve 76 rises, the output of the magnetic amplifier rises also. However, the flux induced by the control current, under these conditions, is always opposed by the flux induced by the feedback current. Moreover, the feedback current is derived from the output of the magnetic amplifier and, hence, is also rising. Consequently, the slope of curve 76 to the left of point 80 is much less than the slope to the right of point 80 and large negative changes in the control current will produce only slight changes in the output voltage of the magnetic amplifier.

As indicated above, when no current is applied to the control winding 38, the magnetic amplifier will operate about point 78 of the curve 76 of Fig. 5. This is about at the midpoint of the sharply inclined portion of curve 76. Thus, operating at this point, positive or negative signals applied to the control winding 38 of the magnetic amplifier 40 will be passed with equal ease to modulate the carrier wave. With no signal applied to the magnetic amplifier, the modulation of the carrier wave would be about fifty percent and positive signals would increase the amplitude of the carrier while negative signals would decrease the amplitude of the carrier. This makes it relatively simple to distinguish between positive and negative signal pulses even after the modulated carrier has been impressed on the cable 12 and transmitted to the surface of the earth.

It will be apparent from Fig. 5 that, when the system is operated about point 78 of curve 76, any moderately large pulse, regardless of polarity, will shift the system over a knee 80 or 81 of the curve 76 to the relatively flat portions 82 of the curve 76. In these regions, there will be virtually no further change in the output of the magnetic amplifier even for large changes in the control current. Unfortunately, noise pulses and detector pulses corresponding to magnetic anomalies other than casing collars will frequently be large enough to drive the system into the regions 82 of curve 76 and, consequently, become indistinguishable from the desired pulses. However, this problem may be overcome if a slight negative bias is applied to the magnetic amplifier by passing direct current in the proper direction through the control windings 28. This causes the operating point of the system to shift to the left of point 78. By choosing a suitable biasing current, the operating point may be made to shift to point 84. This is accomplished in the circuit of Fig. 4 by connecting a D.C. power supply or other suitable voltage source 86 through a high resistance 88 to one side of a low resistance 90 which is connected in series between the control winding 38 and ground.

As stated above, the signal generated by the detector 36 may have a central positive pulse 28 and two negative pulses 24 and 26, as seen in Fig. 2. With the magnetic amplifier biased to operate about point 84 of Fig. 5, as described above, when the detector signal reaches the control windings, the two negative pulses merely decrease the output voltage slightly, as at point 80 of curve 76. Even relatively large negative pulses will not produce greater output signals because the operating characteristic of the magnetic amplifier is relatively flat below point 80.

Figure 6:
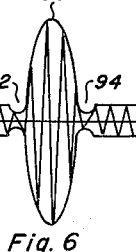
Fig. 6 is a graphic representation of a carrier wave modulated by the device of Fig. 4.

On the other hand, even small positive pulses shift the operation of the system well up the inclined portion of the curve 76 with a corresponding large positive change in the voltage of the system. The effect of this in modulating the carrier signal from oscillator 54 is shown in Fig. 6 where the negative pulses, 24 and 26 of Fig. 2, appear as attenuations 92 and 94 of the carrier signal while the positive pulse, 28 of Fig. 2, which represents the true position of the collar, appears in amplified form at 96 of Fig. 6.

In the event that pulses passing through the magnetic amplifier 40 are amplified to such an extent that many of the positive pulses shift the operation of the system above the upper knee 81 of the characteristic curve 76 of Fig. 5, even with the biasing current applied to the control winding 38, the gain of the magnetic amplifier 40, of Fig. 4, may be controlled by connecting a variable resistance 98 in shunt with the parallel paths 50 and 52 between the uncommon terminals of the reactive windings 46 and 48. In the open circuit position, no current flows through resistance 98 and the magnetic amplifier 40 has full gain. However, when resistance 98 has any finite value, a determinable portion of the carrier current is permitted to leak through the reactive windings 46 and 48 with a polarity opposite to that of the remainder of the carrier current. This leakage current will induce a flux in the toroids 42 and 44 which will have a subtractive effect on fluxes of the preferred polarity. The result of the subtractive flux will be to reduce the slope of the sharply inclined portion of curve 76 in Fig. 5. Consequently, the output voltage of the magnetic amplifier corresponding to any given control current will be less than if no current flowed through resistance 98.

Thus, by properly selecting the value of resistance 98, the gain of the magnetic amplifier 40 may be set at substantially any desired value. The resistance 98 may comprise a plurality of incremental steps, as shown in Fig. 4. However, if desired, a potentiometer or the like may be substituted for the stepped resistance to provide greater flexibility. Conversely, where the desired value of gain is constant, resistance 98 may be a fixed resistor.

As noted above, toroids 42 and 44 may be replaced by a three-legged transformer core. Moreover, numerous other variations and modifications may obviously be made without departing from the invention. For example, the casing collar locator may be used with a well perforator. Accordingly, it should be clearly understood that that form of the invention described above and shown in the figures of the accompanying drawing is illustrative only and is not intended to limit the scope of the invention.

I claim:

1. A signal modulating system comprising a signal source, a carrier wave generator, a magnetic amplifier having a control winding and reactive windings, said control winding being connected to receive signals from said signal source, said reactive windings being connected to modulate the carrier wave from said generator, means connected to said reactive windings to provide a feedback current through said reactive windings only in a direction which will induce a magnetic flux in said magnetic amplifier which will be additive with respect to the magnetic flux induced by current flowing in a preferred direction through said control winding, and variable resistance means connected between said reactive windings for controlling the gain of said magnetic amplifier.

2. A signal modulating system comprising a signal source, a carrier wave generator, a magnetic amplifier having a control winding and reactive windings, said control winding being connected to receive signals from said signal source, said reactive windings being connected to modulate the carrier wave from said generator, means connected to said reactive windings to provide a feedback current through said reactive windings only in a direction which will induce a magnetic flux in said magnetic amplifier which will be additive with respect to the magnetic flux induced by current flowing in a preferred direction through said control winding, and variable resistance means for varying the flow of said feedback current to alter the gain of said magnetic amplifier.

3. A casing collar locator system comprising a magnetic amplifier having a control winding and two reactive windings, a casing collar detector for deriving electrical signals indicative of casing anomalies, means applying said signals to said control winding, a carrier wage generator, a first rectifier with one side connected to one side of one of said reactive windings, a second rectifier with one side connected to one side of the other said reactive windings, the other sides of said reactive windings being connected together and the other sides of said rectifiers being connected together, said rectifiers being connected in a manner to cause current to flow alternately through the respective reactive windings only in a direction which will induce a magnetic flux in said magnetic amplifier which will be additive with respect to the magnetic flux induced by current flowing in a preferred direction through said control winding, a cable, output means connected in series with said carrier wave generator and said reactive windings for impressing the modulated carrier wave on said cable, and means for receiving and utilizing the signal from said cable to produce a record of casing collars as a function of depth.

4. A casing collar locator system comprising a magnetic amplifier having a control winding and two reactive windings, a casing collar detector for deriving electrical signals indicative of casing anomalies, means applying said signals to said control winding, a carrier wave generator, a first rectifier with one side connected to one side of one of said reactive windings, a second rectifier with one side connected to one side of the other said reactive windings, the other sides of said reactive windings being connected together and the other sides of said rectifiers being connected together, said rectifiers being connected in a manner to cause current to flow alternately through the respective reactive windings only in a direction which will induce a magnetic flux in said magnetic amplifier which will be additive with respect to the magnetic flux induced by current flowing in a preferred direction through said control winding, resistance means connected between the uncommon sides of said reactive windings to control the gain of said magnetic amplifier, a cable, output means connected in series with said carrier wave generator and said reactive windings for impressing the modulated carrier wave on said cable, and means for receiving and utilizing the signal from said cable to produce a record of casing collars as a function of depth.

5. A casing collar locator system comprising a magnetic amplifier having a control winding and two reactive windings, a casing collar detector for deriving electrical signals indicative of casing anomalies, means applying said signals to said control winding, a carrier wave generator, a first rectifier with one side connected to one side of one of said reactive windings, a second rectifier with one side connected to one side of the other said reactive windings, the other sides of said reactive windings being connected together and the other sides of said rectifiers being connected together, said rectifiers being connected in a manner to cause current to flow alternately through the respective reactive windings only in a direction which will induce a magnetic flux in said magnetic amplifier which will be additive with respect to the magnetic flux induced by current flowing in a preferred direction through said control winding, variable resistance means connected between the uncommon sides of said reactive windings to control the gain of said magnetic amplifier, a cable, output means connected in series with said carrier wave generator and said reactive windings for impressing the modulated carrier wave on said cable, and means for receiving and utilizing the signal from said cable to produce a record of casing collars as a function of depth.

6. A casing collar locator system comprising a magnetic amplifier having a control winding and two reactive windings, a casing collar detector for deriving electrical signals indicative of casing anomalies, means applying said signals to said control winding, biasing means connected between said detector and said control winding, said biasing means passing current through said control winding to cause said magnetic amplifier to operate about a point near the minimum of its operating characteristic, a carrier wave generator supplying a carrier wave to said magnetic amplifier for modulation, means connected to said reactive windings to provide a feedback current through said reactive windings only in a direction which will induce a magnetic flux in said magnetic amplifier which will be additive with respect to the magnetic flux induced by current flowing in a preferred direction through said control winding, a cable, output means for applying the modulated carrier wave to said cable, and means for receiving the signal carried by said cable and utilizing the information supplied thereby.

7. A casing collar locator system comprising a magnetic amplifier having a control winding and two reactive windings, a casing collar detector for deriving electrical signals indicative of casing anomalies, means applying said signals to said control winding, a carrier wave generator, a first rectifier with one side connected to one side of one of said reactive windings, a second rectifier with one side connected to one side of the other said reactive windings, the other sides of said reactive windings being connected together and the other sides of said rectifiers being connected together, said rectifiers being connected in a manner to cause current to flow alternately through the respective reactive windings only in a direction which will induce a magnetic flux in said magnetic amplifier which will be additive with respect to the magnetic flux induced by current flowing in a preferred direction through said control winding, a cable, output means connected in series with said carrier wave generator and said reactive windings for impressing the modulated carrier wave on said cable, means for receiving and utilizing the signal from said cable to produce a record of casing collars as a function of depth, and biasing means connected to said control winding, said biasing means causing said magnetic amplifier to operate at approximately minimum output voltage in the absence of any detector signal applied to said control winding.

8. A signal modulating system comprising a magnetic amplifier having a control winding and two reactive windings, a signal generator, means applying signals from said signal generator to said control winding, a carrier wave generator, a first rectifier with one side connected to one side of one of said reactive windings, a second rectifier with one side connected to one side of the other said reactive windings, the other side of each of said reactive windings being connected together and the other side of each of said rectifiers being connected together, said rectifiers being connected in a manner to cause current to flow alternately through the respective reactive windings only in a direction which will induce a magnetic flux in said magnetic amplifier which will be additive with respect to the magnetic flux induced by current flowing in a preferred direction through said control winding, variable resistance means connected between the uncommon sides of said reactive windings to control the gain of said magnetic amplifier, output means connected in series with said carrier wave generator and said reactive windings.

9. The system of claim 2 wherein said means for varying the flow of said feedback current comprises a variable resistance connected between said reactive windings.

References Cited in the file of this patent

UNITED STATES PATENTS

| | | |
|---|---|---|
| 2,265,296 | Lee | Dec. 9, 1941 |
| 2,370,818 | Silverman | Mar. 6, 1945 |
| 2,507,351 | Scherbatskoy | May 9, 1950 |
| 2,554,844 | Swift | May 29, 1951 |
| 2,675,518 | Morgan | Apr. 13, 1954 |
| 2,682,632 | Cohen et al. | June 29, 1954 |
| 2,785,374 | Fay et al. | Mar. 12, 1957 |
| 2,807,775 | Schmidt | Sept. 24, 1957 |